3 Sheets—Sheet 1.
D. H. BURRELL & J. NAYLOR, Jr.
Machine for Dressing and Finishing Barrel Hoops.
No. 233,471.            Patented Oct. 19, 1880.
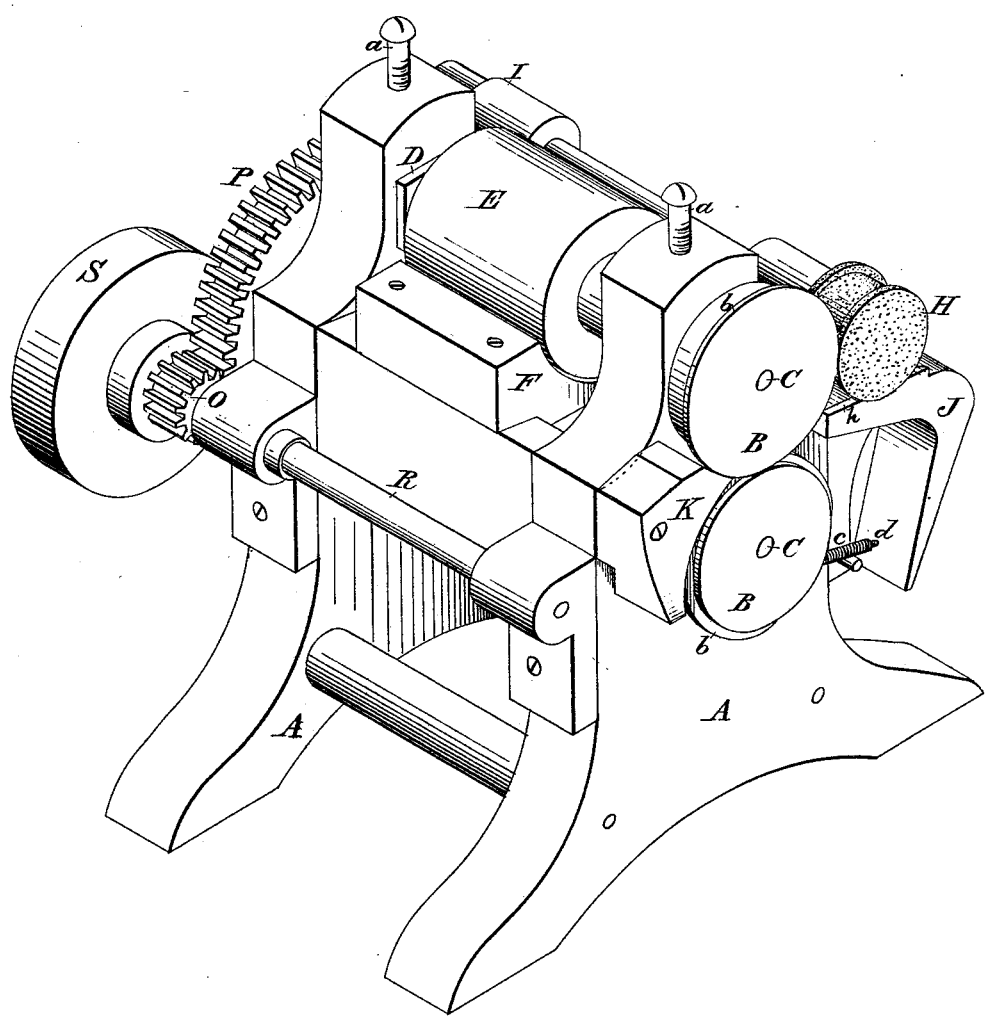

3 Sheets—Sheet 2.
D. H. BURRELL & J. NAYLOR, Jr.
Machine for Dressing and Finishing Barrel Hoops.
No. 233,471. Patented Oct. 19, 1880.
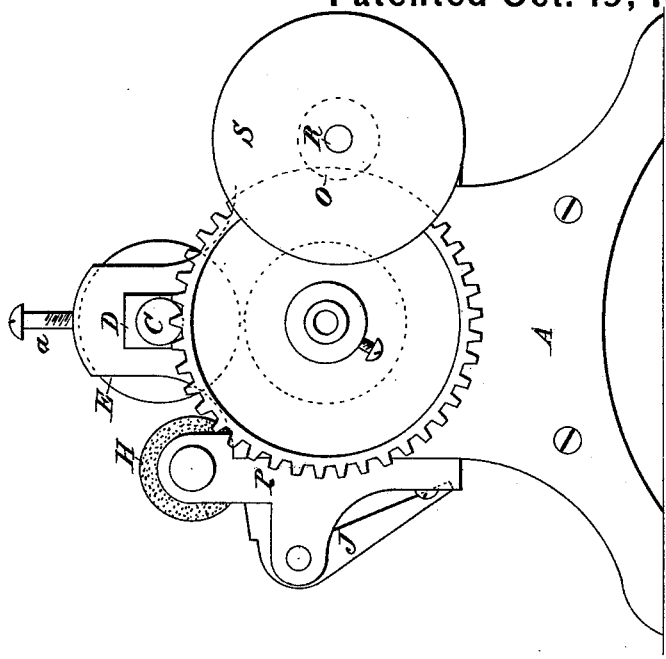
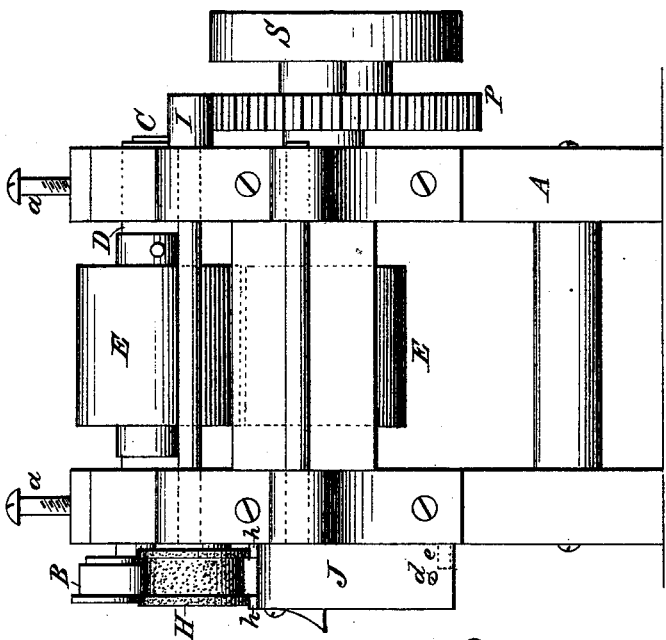

3 Sheets—Sheet 3.
D. H. BURRELL & J. NAYLOR, Jr.
Machine for Dressing and Finishing Barrel Hoops.
No. 233,471. Patented Oct. 19, 1880.
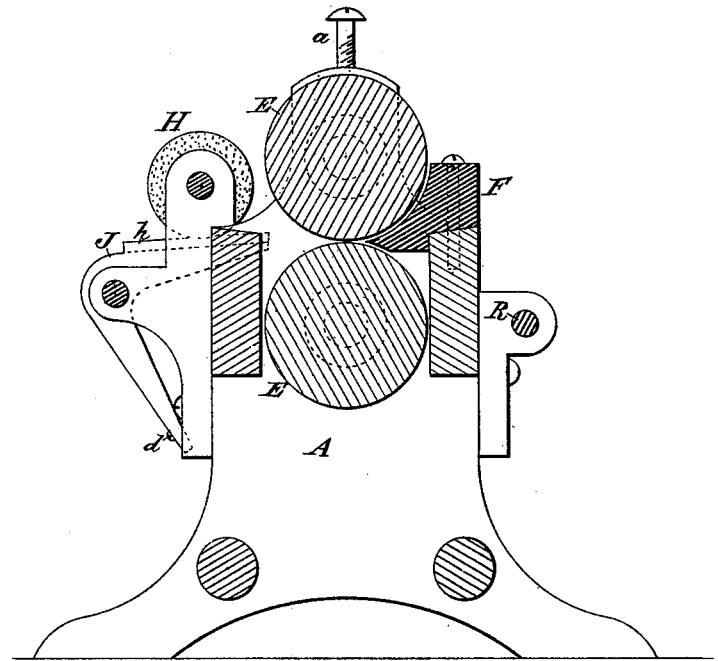
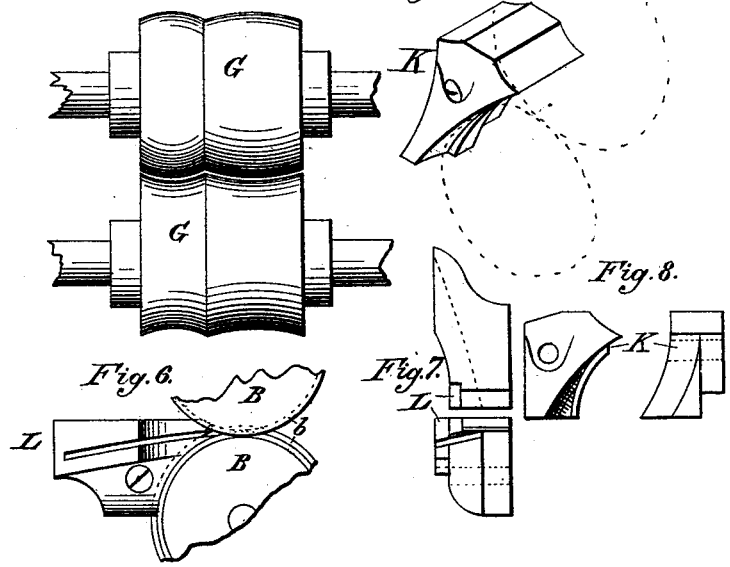
Attest:
F. H. Schott.
D. P. Cowl
Inventors:
David H. Burrell
James Naylor Jr

UNITED STATES PATENT OFFICE.

DAVID H. BURRELL, OF LITTLE FALLS, AND JAMES NAYLOR, JR., OF ROCHESTER, ASSIGNORS TO SAID BURRELL AND BURRELL, IVES & CO., OF LITTLE FALLS, NEW YORK.

MACHINE FOR DRESSING AND FINISHING BARREL-HOOPS.

SPECIFICATION forming part of Letters Patent No. 233,471, dated October 19, 1880.

Application filed November 29, 1878.

*To all whom it may concern:*

Be it known that we, DAVID HAMLIN BURRELL, of Little Falls, in the county of Herkimer, State of New York, and JAMES NAYLOR, Jr., of the city of Rochester, county of Monroe, State of New York, have invented certain new and useful Improvements in Machines for Dressing and otherwise Finishing Barrel-Hoops, Staves, Cheese-Box Rims, and similar articles, which improvements are fully set forth in the following specification, reference being had to the accompanying drawings and the letters of reference marked thereon, similar letters indicating like parts in the different figures.

Figure 1 is a perspective view of the rear and one side of the machine. Fig. 2 is a side elevation. Fig. 3 is a front elevation; Fig. 4, a longitudinal vertical section; Fig. 5, a side view of the stave-rolls. Figs. 6, 7, and 8 are detail views of the feed-rolls and crimping-shoes.

One of the objects of our invention is to take hoops which are not formed with the necessary taper to fit a bilged barrel and by passing them through the machine give them the desired form. At present there are many successful machines making hoops of this kind, and the hoops so made by the said machines from a log, bolt, or plank, after being dried, are more or less out of shape and discolored. Our machines will dress and finish these hoops so cut with the least possible waste of material and take off the discolored surface and make the hoop fit a bilged barrel without materially altering the shape of the hoop sectionally.

To enable any person unskilled in the art to understand fully what is claimed as new, it will be proper here to describe the manner in which machine cut or sawed hoops are generally made and finished.

In the first place, in sawing hoops there is great expense and waste, which gives demand for the various devices used in cutting them, the saving of material or stock being the object sought. When hoops are so cut without waste the most perfect of these machines, and the ones most likely to come into general use, cut the hoops with a rectangular section, or nearly so. Such a hoop has to be made to fit a bilged barrel before it is of any especial value, and the method mostly in use at present is to plane away a surplus of the stock, so as to form the necessary bevel. This is wasteful, and also requires expensive machinery, requiring constant care and attention in order to secure satisfactory results.

There are also other machines of recent invention in which the bevel is made by compression, which is a great improvement over the foregoing method.

In order to fully distinguish our machine from those last referred to, it will be understood that we do not materially change the shape of the hoop sectionally, while in the other machines it is so changed; and our invention consists, principally, in taking a hoop cut straight every way, or nearly so, and by means hereinafter specified, making said hoop fit a bilged barrel without cutting or compressing it to a beveled section. The means employed in dressing the hoops in the economical and effective manner hereinafter shown is also a distinct feature of our invention.

It also consists in the novel construction and arrangement of mechanical devices by which we are enabled to accomplish these results. To these distinct features we confine our invention.

A A are the sides of the frame-work of the machine, connected by suitable cross-bars, and constructed so as to insure strength to the parts requiring it, and at the same time to give grace to its general appearance.

B B are feed-rolls made to conform to the shape of the hoop before being operated on, and provided with flanges *b b*, for the purpose of holding the hoop in place laterally during its passage through the feed-rolls.

We strictly confine ourselves to the use of the rolls B B for feeding purposes only, and do not use them in the present case for anything else. These feed-rolls may be placed outside the frame of the machine and secured to the ends of the shafts C C, the upper one of which shafts runs in adjustable boxes D D, adjusted by means of the screws *a a* bearing upon their upper sides, and the packing placed underneath. By this means the feed-rolls are adjusted to a proper distance from each other.

E E are smooth rolls secured to the shafts C C, and operated by the same mechanism as are the rolls B B, which consists of a spur-gear, P, secured upon one end of the lower one of the pair of shafts C C. A pinion, O, upon the shaft R engages with the gear P, and thus, by means of a belt from any suitable motor to the pulley S upon the shaft R, motion is given to the moving parts of the machine.

F is a crimping-guide, arranged so as to be concentric with either one of the rolls, the extreme edge of which guide is close to the periphery of the roll, not concentric with it. This arrangement of these three parts is for the purpose of shaping hoops for cheese-box rims, which it does most effectually without steaming. Even at the present time box-rims are steamed so as to bend them; but by an accurate adjustment of the mechanism as described this process of steaming is dispensed with.

G G are rolls for shaping staves, and can be inserted in place of the rolls E E when the machines are intended to run in a barrel-factory.

When the rolls G G are to be used for shaping staves the crimping-guide F is removed, thus allowing the staves to pass nearly straight through the machine. By rolling staves in this manner they are brought to the circle on which they were originally cut, for in drying they are piled upon each other and get flattened out. After being run through the rolls the staves are shaped so that when set up they make smoother and better-looking barrels. Hence the adaptability of the machine for this purpose.

H is an emery or sand wheel, which is rotated at a very high rate of speed by a belt from a counter-shaft above onto the pulley I. This wheel H is for dressing the hoop as it is fed along through the machine, and can be made solid or in parts, so as to allow a wider hoop than usual to pass between its flanges without retarding its velocity; but as these are exceptional cases we prefer to use it constructed in one piece, as shown. These emery or sand wheels can also be used in the same machine for finishing or polishing iron hoops when such a hoop is desired.

Immediately below the emery-wheel is the yielding guide J, provided with guiding-ribs $h$ on its upper surface. These ribs are for the purpose of holding the hoop laterally, and also act as a guide to keep the hoop in proper position to be acted upon by the emery or sand wheel H. This guide J is made yielding by any simple means, for the purpose of holding the hoop not too rigidly during its progress against the surface of the wheel.

We do not confine ourselves to the use of two flanges on the emery-wheel and two ribs on the guide, as by using them single on opposite sides of the hoop the same result may be effected.

K is a shoe or guide of peculiar construction, and, forming, as it does, an important feature of our invention, calls for especial notice.

It has been already observed that the hoop is held during its progress by the feed-rollers B B and laterally by the rib or ribs of the yielding guide J. It is while the hoop is so held laterally by these agencies that the shoe K so contorts and strains the fiber without breakage that the hoop, after having passed through the machine, is sufficiently flared to obviate the necessity of beveling at all, the under side of the shoe contiguous to the surface of the lower feed-roll, B, being provided with a lip or projection which tapers inward to a point in proximity to the lower inner periphery of the flange of said roll, from which point it curves downward and outward, receding with its outward portion from the periphery of the lower feed-roll, B, and from the inner side of the flange of said feed-roll, as shown in Figs. 1 and 9, whereby the conformation above referred to is given to the hoop as desired.

It must be observed that the shape of the shoe is such that the hoop, in its progress, bears very evenly and is supported over its entire surface. It may be also observed that in this instance, although we do not confine our invention thereto, the hoops are thrown out directly onto the open floor, and their accumulation will not therefore seriously interfere with the working of the machine.

The shaping-rolls G G or E E, before referred to, for staves, box-rims, &c., can be operated at the same time hoops are being finished. This enables two or even three workmen to be employed advantageously at each machine.

It must be understood that in the arrangement of these rolls so operated by the same driving mechanism we effect decidedly important results—viz., a single machine at one price doing almost all the machine-work a cooper-shop calls for, and doing it economically and effectively.

The operation of our improved machine is as follows: The workman dressing and finishing hoops presents the hoop to the emery or sand wheel H, resting it on the yielding guide J between the guiding-ribs. It is then forced along until it is caught by the feed-rolls B B. Immediately after passing the feed-rolls the hoop is forced to take the difficult path laid out by the shoe K. After the end of the hoop has passed the feed-rolls and shoe it falls clear of the machine onto the floor, ready for the cooper's use. If the hoops so flared are to be used uncoiled, the shoe K is removed and the shoe L attached to the machine in place of it. This shoe L is constructed upon the same principles as the shoe K, with this difference, that the guideway has only a single curvature for bending the hoop edgewise. By having a variety of these flaring and coiling shoes, hoops may be made of any desired flare and coiled to any required circle. These changes do not in any way depart from our improved method of operation. It is more convenient to ship hoops in bunches than in coiled nests.

Hoops may also be bent edgewise by variously-devised means or appliances; but in dressing and finishing such hoops our invention can be made use of. If the emery or sand wheel does not cut sufficiently, the spring $c$ can be taken up by the screw $d$ and more pressure brought to bear on the hoop. There is also a stop, $e$, attached to the frame to prevent the face of the yielding guide J from striking the wheel H when the machine is running empty.

The operation of shaping box-rims or staves is simply that of passing them through the rolls prepared for this purpose.

Having thus described our invention, we claim as new, and desire to secure by Letters Patent, the following:

1. In a machine for finishing hoops, the emery or sand wheel H, in combination with the pivoted and yielding guide J, grooved on its upper surface for treating the hoop, substantially as specified.

2. The feeding-rolls provided with flanges $b\ b$, in combination with the yielding guide J, provided with ribs $h\ h$, forming the means whereby the hoop is held in place laterally while passing the shoes.

3. The combination, substantially as described, of the dressing-wheel, the yielding guide, the feeding-rolls, and the crimping-shoe, for the purpose of preparing cut or sawed hoops, for use in the manner set forth.

4. The flanged feed-rolls B B, the shoe K, the wheel H, and flanged yielding guide J, when constructed, combined, and arranged in the manner and for the purpose specified.

DAVID HAMLIN BURRELL.
JAMES NAYLOR, JUNR.

Witnesses:
H. BUCHANAN,
C. VAN VECHTEN.